US008373911B2

(12) United States Patent
Iwata et al.

(10) Patent No.: US 8,373,911 B2
(45) Date of Patent: Feb. 12, 2013

(54) IMAGE READING APPARATUS

(75) Inventors: Naoyuki Iwata, Gifu (JP); Takeshi Takami, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 146 days.

(21) Appl. No.: 13/076,517

(22) Filed: Mar. 31, 2011

(65) Prior Publication Data

US 2012/0050826 A1 Mar. 1, 2012

(30) Foreign Application Priority Data

Aug. 30, 2010 (JP) ................................. 2010-191715

(51) Int. Cl.
H04N 1/04 (2006.01)
(52) U.S. Cl. ........ 358/474; 358/498; 358/497; 358/496; 399/114; 399/367; 271/145; 271/10.12
(58) Field of Classification Search .................. 358/474, 358/498, 497, 496, 486; 399/114, 110, 124, 399/393, 405, 367, 379; 271/3.2, 145, 279, 271/10.12, 229
See application file for complete search history.

(56) References Cited

U.S. PATENT DOCUMENTS

| | | | | |
|---|---|---|---|---|
| 6,167,239 A * | 12/2000 | Wright et al. | ................. | 455/66.1 |
| 6,208,828 B1 * | 3/2001 | Awai et al. | .................... | 399/361 |
| 7,672,636 B2 * | 3/2010 | Ono | ............................... | 399/380 |
| 7,733,540 B2 * | 6/2010 | Moribe | ......................... | 358/474 |
| 7,784,893 B2 * | 8/2010 | Ishida et al. | .................... | 347/16 |
| 7,826,105 B2 * | 11/2010 | Yamaguchi | ..................... | 358/474 |
| 7,826,109 B2 * | 11/2010 | Ikeno et al. | ..................... | 358/498 |
| 7,948,603 B2 * | 5/2011 | Tanaka | ............................. | 355/30 |
| 8,040,546 B2 * | 10/2011 | Matsumoto et al. | ......... | 358/1.15 |
| 8,109,481 B2 * | 2/2012 | Suzuki et al. | .............. | 248/274.1 |
| 8,120,821 B2 * | 2/2012 | Ishida et al. | .................. | 358/474 |
| 8,199,373 B2 * | 6/2012 | Ito | .................................. | 358/474 |
| 8,223,405 B2 * | 7/2012 | Osakabe et al. | .............. | 358/471 |
| 2002/0067939 A1 | 6/2002 | Hamada et al. | | |
| 2010/0102500 A1 | 4/2010 | Ito | | |

FOREIGN PATENT DOCUMENTS

| JP | 2001-197232 | 7/2001 |
|---|---|---|
| JP | 2002-165061 | 6/2002 |
| JP | 2010-109573 | 5/2010 |

* cited by examiner

Primary Examiner — Negussie Worku

(74) Attorney, Agent, or Firm — Banner & Witcoff, Ltd.

(57) ABSTRACT

An image reading apparatus is provided. The image reading apparatus includes a main unit and a conveyer unit swingably coupled to the main unit via a hinge. The conveyer unit includes a lower cover with an opening, which extends orthogonally to a swing axis of the conveyer unit, and an attachable member. The attachable member includes a main part and an auxiliary part and is fixed to the lower cover by the main part and to a rotatable fixing section of the hinge by the auxiliary part.

8 Claims, 11 Drawing Sheets

IMAGE READING APPARATUS

CROSS REFERENCE TO RELATED APPLICATION

This application claims priority from Japanese Patent Application No. 2010-191715, filed on Aug. 30, 2010, the entire subject matter of which is incorporated herein by reference.

BACKGROUND

1. Technical Field

An aspect of the present invention relates an image reading apparatus.

2. Related Art

An image reading apparatus having a main unit and a conveyer unit on top of the main unit is known. The main unit may include a flatbed, on which a sheet of original document to be read is placed, and an image reader, which is movable along the flatbed in a range from one side to the other side of the flatbed. Whilst being moved along the flatbed, the image reader scans and read an image appearing on the sheet.

In the image reading apparatus, the conveyer unit may be coupled to the main unit via hinges to be swingable about a swing axis, which extends in parallel with the moving direction of the image reader. The hinge may include an in-main-unit section, which is inserted in a pit formed in the main unit, and an in-conveyer-unit section, which is fixed to the conveyer unit, whilst the in-main-unit section and the in-conveyer-unit section are rotatable with respect to each other. Thereby, the conveyer unit may be movable between a closed position, in which the conveyer unit covers the flatbed in the main unit, and an open position, in which the flatbed is exposed.

Further, the conveyer unit may include a bottom cover, which faces the flatbed when the conveyer unit is in the closed position, and a sheet conveyer, which is arranged on top of the bottom cover. The bottom cover may have a linear opening, which extends along a direction orthogonal to the swing axis of the conveyer unit. The bottom cover may fall in a position above the image reader being in an initial stopped position when the conveyer unit is in the closed position. Whilst the sheet is conveyed in the conveyer unit, the image reader in the stopped position can read the image on the sheet passing over the image reader through the opening.

SUMMARY

The above-mentioned image reading apparatus may be equipped with a self-locking hinge, which can hold the conveyer unit in a desired position between the closed position and the open position, in consideration of convenience for a user's opening and closing motions of the conveyer unit. Further, in order to arrange components in the image reading apparatus space-efficiently to reduce an entire size of the image reading apparatus, the self-locking hinge may be fixed to an end position of the conveyer unit along an edge extending in an axial direction of the swing axis of the conveyer unit. In this regard, when the conveyer unit is opened to expose the flatbed, torque generated in the self-locking hinge may be transmitted to the conveyer unit, specifically in the area holding the self-locking hinge in the bottom cover. Therefore, if the self-locking hinge is mounted in the end position closer to the linear opening in the conveyer unit with the in-conveyer-unit section fixed to the conveyer unit, reaction force against the torque may concentrate in the area in vicinity of the in-conveyer-unit section in the bottom cover. With the concentrated force, the area in the vicinity of the in-conveyer-unit section may be specifically exhausted or damaged whilst the conveyer unit is repeatedly opened and closed over a long period of time. Accordingly, the image forming apparatus may not be durable over a long period of time.

In view of the above deficiencies, the present invention is advantageous in that an image reading apparatus, in which handling convenience for opening/closing motions of a conveyer unit is improved, is provided. Further, an entire size of the image reading apparatus is reduced, and durability for the opening/closing motions of the conveyer unit is improved.

According to an aspect of the present invention, an image reading apparatus is provided. The image reading apparatus includes a main unit including a flatbed plane, on which a document sheet to be read is placed, and an image reader, which is movable in a range between a stop position at one side of the flatbed plane and the other side of the flatbed plane along a predetermined moving direction and is capable of reading an image on the document sheet placed on the flatbed plane, and a conveyer unit, which is coupled to the main unit via a main hinge to be swingable about a swing axis, the swing axis extending along a direction in parallel with the moving direction of the image reader, and movable between a closed position to cover the flatbed plane and an open position to expose the flatbed plane. The main hinge includes an in-main-unit fixing section, which is fixed to the main unit, and a rotatable fixing section, which is fixed to one of end positions along the direction of the swing axis of the conveyer unit, and generates torque to act on the conveyer unit when the conveyer unit is moved to the open position. The conveyer unit includes a lower cover, which faces the flatbed plane when the conveyer unit is in the closed position, a sheet conveyer, which is arranged on the lower cover and conveys the document sheet toward the image reader being at the stop position, and a rigid attachable member, which is attached to the lower cover. The lower cover is formed to have an elongated-shaped opening, which extends along a direction orthogonal to the swing axis in a higher position with respect to the image reader being at the stop position when the conveyer unit is in the closed position, and over which the document sheet being conveyed by the sheet conveyer passes. The opening includes paired orthogonal edges extending orthogonally to the swing axis of the conveyer unit. When a virtual line including one of the paired orthogonal edges closer to a widthwise center of the lower cover is provided, the lower cover includes a main area, which ranges from the virtual line to the other of the end positions along the direction of the swing axis of the conveyer unit, and an auxiliary area, which ranges from the virtual line to the one of the end positions along the direction of the swing axis of the conveyer unit. The attachable member extends in a range including a part of the main area and a part of the auxiliary area, to straddle the virtual line between the main area and the auxiliary area, and includes a main part, which is arranged in the part of the main area, and an auxiliary part, which is arranged in the part of the auxiliary area. The attachable member is fixed to the lower cover by the main part and to the rotatable fixing section by the auxiliary part.

BRIEF DESCRIPTION OF THE ACCOMPANYING DRAWINGS

DETAILED DESCRIPTION

Hereinafter, an MFP 10 according to an embodiment of the present invention will be described with reference to the accompanying drawings. The MFP 10 is a multifunction peripheral device, which is capable of reading an image appearing on an original sheet, printing an image on a recording sheet, and exchanging image data with external devices.

Figure 1:
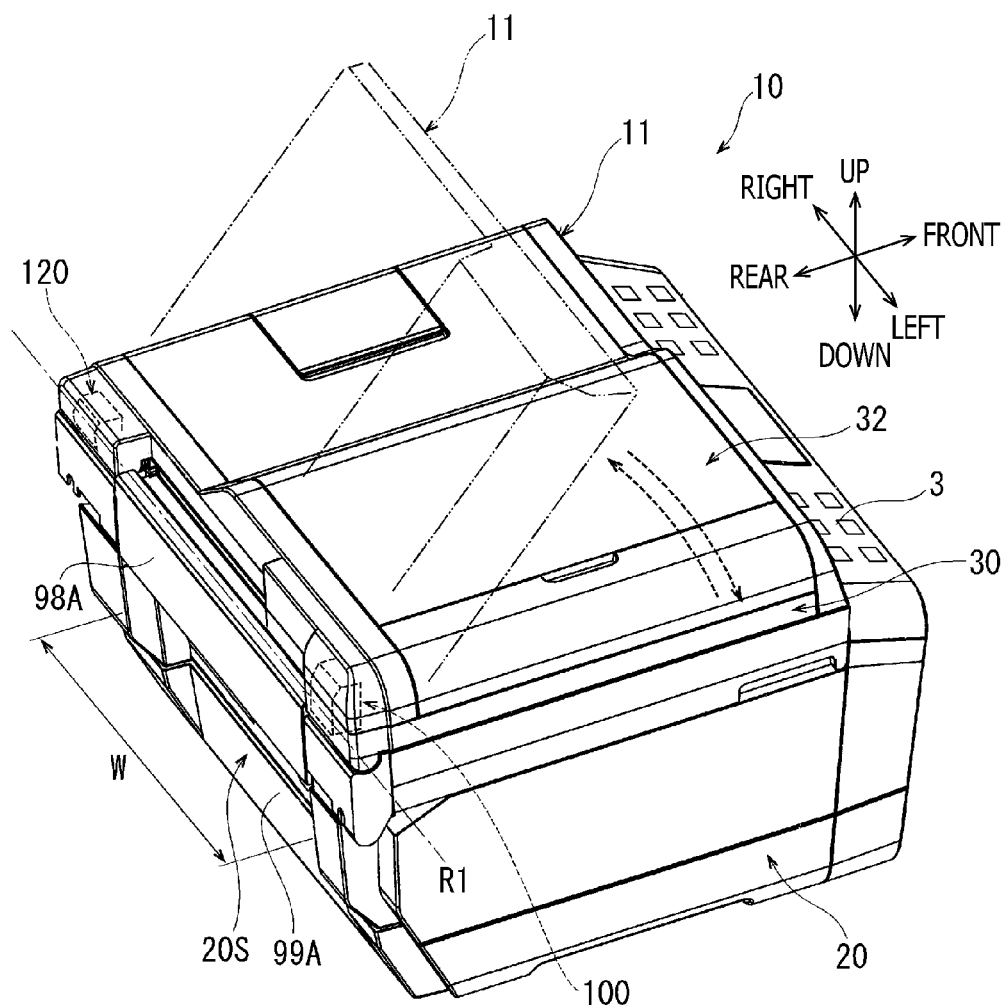
FIG. 1 is a perspective view of an MFP (multifunction peripheral device) according to an embodiment of the present invention.

In the description below, directions concerning the MFP 10 will be referred to based on a user's position to use the MFP 10 whilst it is assumed that the user faces a front side of the MFP 10. That is, a viewer's upper right-hand side appearing in FIG. 1 is referred to as the user's front of the MFP 10, and a lower left-hand side in FIG. 1 opposite from the front side is referred to as rear, whilst the MFP 10 has an operation panel 3 on the front side thereof. A side which corresponds to the viewer's nearer side is referred to as left, and an opposite side from the left, which corresponds to the viewer's further side, is referred to as the user's right. The up-down direction in FIG. 1 corresponds to a vertical direction of the MFP 10. Further, the vertical direction of the MFP 10 may be referred to as a direction of height, the user's right-left direction may be referred to as a widthwise direction, and the user's front-rear direction may be referred to as a direction of depth. The direction of height, the widthwise direction, and the direction of depth are perpendicular to one another.

Overall Configuration of the MFP

Figure 2:
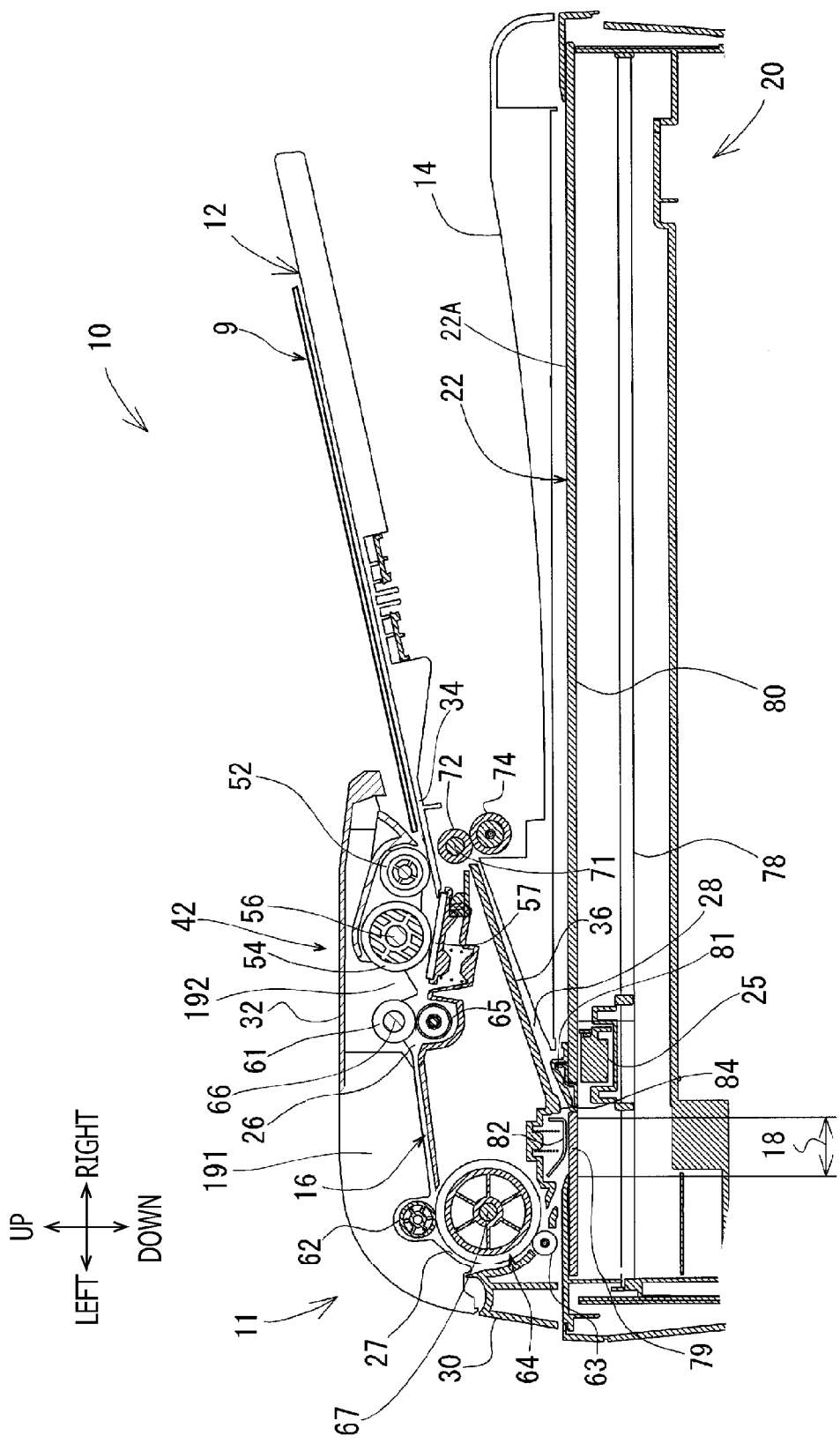
FIG. 2 is a cross-sectional side view of an image reader unit in a main unit and an auto-document feeder (ADF) in the MFP according to the embodiment of the present invention.

The MFP 10 according to the present embodiment includes a main unit 20 and an auto-document feeder (ADF) 11 (see FIGS. 1 and 2). The main unit 20 includes the operation panel 3 on the front side thereof. The operation panel 3 provides an interface with the user and accepts the user's instructions concerning operations in the MFP 10, such as image reading/forming processes and parameter settings. The operation panel 3 includes a display (unsigned), which displays information concerning the operations executed in the MFP 10.

The main unit 20 has a contact glass 22 in an upper section thereof (see FIG. 2). The contact glass 22 includes a glass 80 for movable image-reader (hereinafter, a movable-reader glass 80) and a glass 79 for fixed image-reader (hereinafter, a fixed-reader glass 79). The movable-reader glass 80 and the fixed-reader glass 79 are aligned side-by-side in a same horizontal plane. The movable-reader glass 80 is formed to have a rectangular shape, which has a substantial size to include various sizes of original sheets and books. The fixed-reader glass 79 is formed to have a linearly elongated rectangular shape, which extends in the direction of depth of the MFP 10. In a position between the movable-reader glass 80 and the fixed-reader glass 79, a sheet separator 81 is arranged. An upper surface of the movable-reader glass 80 serves as a flatbed plane 22A, on which the original sheet to be read is placed.

In the main unit 20, an image reader 25 is arranged in a lower position with respect to the contact glass 22, and an image forming unit 29 (see FIG. 5) is arranged in a lower position with respect to the image reader 25. The image forming unit 29 will be described later in detail. Further, the main unit 20 includes a controller (not shown), which controls behaviors of the image reader 25, the image forming unit 29, and the ADF 11.

The ADF 11 is a conveyer unit to convey the sheet 9 in the MFP 10 and is arranged in the upper position in the MFP 10 to cover a top section of the main unit 20 including the flatbed plane 22A (see FIGS. 1 and 2). The ADF 11 includes a sheet-feed tray 12, in which one or more original sheets 9 of document to be read are set, and a discharge tray 14, in which the sheets having been read are ejected. As shown in FIG. 2, the sheet-feed tray 12 and the discharge tray 14 are arranged in vertically overlapping positions. The ADF 11 further includes a sheet conveyer 42, which picks up the sheet 9 from the sheet stack in the sheet-feed tray 12 and carries the picked-up sheet 9 along a sheet path 16 to be ejected in the discharge tray 14.

Figure 3:
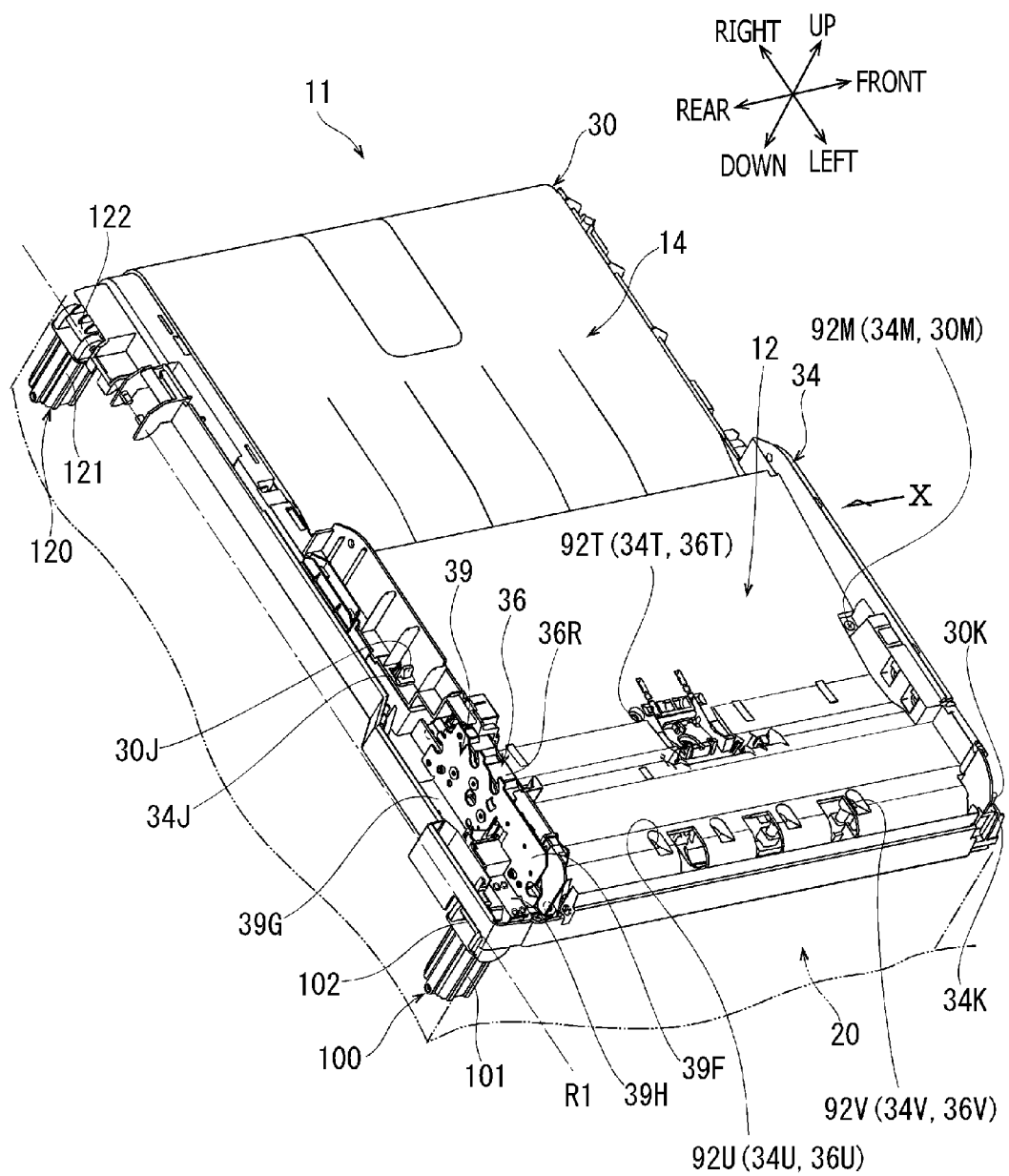
FIG. 3 is a perspective view of the ADF, in which an upper cover and a sheet conveyer are omitted, in the MFP according to the embodiment of the present invention.

As shown in FIG. 1, the ADF 11 is coupled to a rear side of the main unit 20 at a rear side thereof via hinges including a main hinge 100 and an auxiliary hinge 120 to be swingable about a swing axis R1. The swing axis R1 extends along the widthwise direction of the MFP 1. As seen in FIG. 3, in which outlines of the main unit 20 are drawn in double-dotted lines, and in which an upper cover 32 and the sheet conveyer 42 are omitted from the ADF 11, the main hinge 100 is arranged in a left-side rear corner section of the main unit 20 and the ADF 11, i.e., in a leftmost position on a rear edge extending along a direction of the swing axis R1 of the main unit 20 and the ADF 11. On the other hand, the auxiliary hinge 120 is arranged in a right-side corner section of the main unit 20 and the ADF 11, i.e., in a rightmost position on the rear edge extending along the direction of the swing axis R1 of the main unit 20 and the ADF 11.

Figure 4:
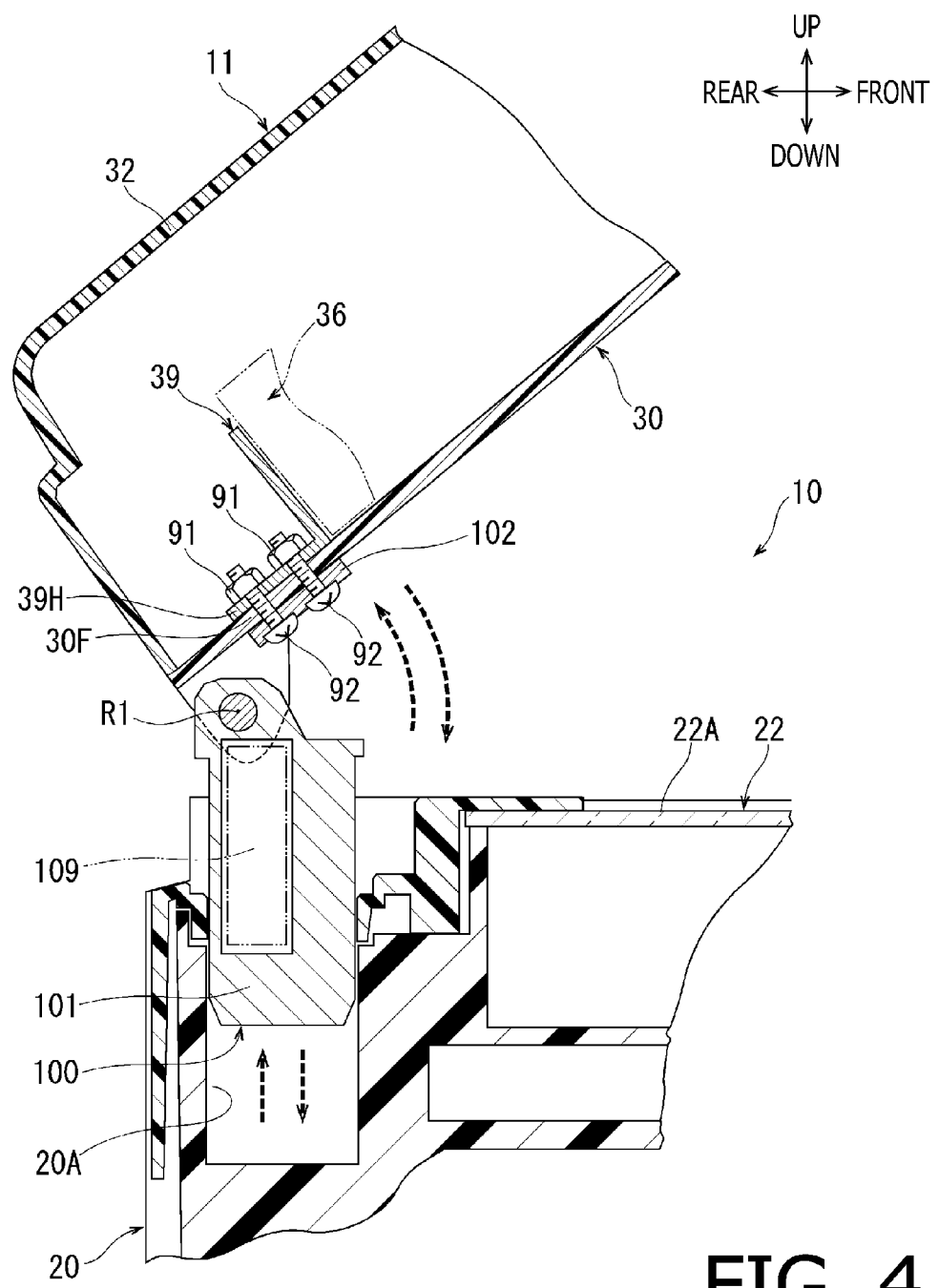
FIG. 4 is a cross-sectional partial view of the ADF with a hinge in the MFP according to the embodiment of the present invention.

The main hinge 100 includes, as shown in FIGS. 3 and 4, an in-main-unit fixing section 101 and a rotatable fixing section 102. The in-main-unit fixing section 101 is formed to have a shape of prism extending downward from the swing axis R1 The rotatable fixing section 102 includes a flat plate, which is rotatable with respect to the in-main-unit fixing section 101 about the swing axis R1.

The in-main-unit fixing section 101 extending downward is inserted in a guide pit 20A, which is formed downwardly from the top surface of the main unit 20, to be vertically movable in the guide pit 20A. Therefore, the main hinge 100 is enabled to move vertically with respect to the main unit 20.

The rotatable fixing section 102 is fixed to the leftmost section of the ADF 11 on the rear edge extending along the direction of the swing axis R1. A fixing structure of the rotatable fixing section 102 in cooperation with the ADF 11 will be described later in detail.

The main hinge 100 is a known self-locking hinge, which includes a torque generator 109. The torque generator 109 provides expanding force to open the rotatable fixing section 102 with respect to the in-main-unit fixing section 101 and breaks rotating motions of the rotatable fixing section 102 with respect to the in-main-unit fixing section 101. Description of more detailed configuration of the self-locking hinge is omitted.

The auxiliary hinge 120 includes, as shown in FIG. 3, an in-main-unit fixing section 121 and a rotatable fixing section 122. The in-main-unit fixing section 121 is formed to have a shape of prism extending downward from the swing axis R1 The rotatable fixing section 122 includes a flat plate, which is rotatable with respect to the in-main-unit fixing section 121 about the swing axis R1.

Similarly to the in-main-unit fixing section 101 of the main hinge 100, the in-main-unit fixing section 121 extending downward is inserted in a guide pit (not shown), which is formed downwardly from the top surface of the main unit 20, to be vertically movable in the guide pit. Therefore, the auxiliary hinge 120 is enabled to move vertically with respect to the main unit 20. The rotatable fixing section 122 is fixed to the rightmost section of the ADF 11 on the rear edge extending along the direction of the swing axis R1.

Further, similarly to the main hinge 100, the auxiliary hinge 120 is a self-locking hinge including a torque generator (not shown). As shown in FIG. 2, the MFP 10 in the present embodiment has the sheet conveyer 42 with substantial weight arranged in an eccentric position closer to the left-side edge of the ADF 11 along the swing axis R1. Therefore, according to the above-described arrangement of the hinges 100, 120, the main hinge 100 mainly holds the weight of the sheet conveyer 42 whilst the auxiliary hinge 120 supplementarily supports the weight of the sheet conveyer 42. In this regard, the auxiliary hinge 120 may be replaced with a known normal hinge.

With the main hinge 100 and the auxiliary hinge 120, the ADF 11 is swingable about the swing axis R1 and movable between the open position to expose the flatbed plane 22A and the closed position to cover the flatbed plane 22A. The ADF 11 in the closed position is drawn in solid lines in FIG. 1. When the user uplifts a front end of the ADF 11, the ADF 11 swings about the swing axis R1, and the flatbed plane 22A of the main unit 20 is exposed. In the present embodiment, an uplifted position of the ADF 11 exposing the flatbed plane 22A is referred to as the open position as long as the flatbed plane 22A is exposed. Outlines of the ADF 11 in one of the open positions are drawn in double-dotted lines in FIG. 1. With the ADF 11 is in the open position, the user may place a sheet of original document or an original document with substantial thickness (e.g., a book) on the exposed flatbed plane 22A.

When the user presses the front end of the ADF 11 in the open position downwardly, the ADF 11 rotates about the swing axis R1 in a reverse direction and returns to the closed position. In this regard, when the original document with substantial thickness is placed on the flatbed plane 22A, the main hinge 100 and the auxiliary hinge 120 are uplifted according to the thickness of the original document. Thus, the ADF 11 is moved vertically with respect to the main unit 20 and displaced to be in an orientation to be in parallel with the flatbed plane 22A of the main unit 20 with the original document intervening in there-between.

When the user uplifts and presses down the ADF 11, the torque generator 109 of the main hinge 100 and the torque generator in the auxiliary hinge 120 generates rotating force to open the rotatable fixing section 102 with respect to the in-main-unit fixing section 101 to hold the weight of the ADF 11. Therefore, the user can swing the ADF 11 with smaller force. When the user stops the ADF 11 in a desired position, the torque generator 109 of the main hinge 100 and the torque generator in the auxiliary hinge 120 damps the displacing force of the rotatable fixing section 102 with respect to the in-main-unit fixing section 101 and holds the ADF 11 at the position. Therefore, the user can release the ADF 11 and easily set and remove the original document on and from the flatbed plane 22A. In other words, the main hinge 100 and the auxiliary hinge 120, which generate torque to affect the ADF 11 when the flatbed plane 22A is exposed, improve usability of the ADF 11.

Image Reader

The image reader 25 will be described in detail. The image reader 25 is arranged in the lower position with respect to the contact glass 22 within the main unit 20. The image reader 25 may be a known image sensor such as a contact image sensor (CIS) and a charge coupled device (CCD). In the present embodiment, the image reader 25 is a CIS.

The main unit 20 includes a slider shaft 78, which extends along the widthwise direction of the MFP 10, inside a chassis of the main unit 20. The image reader 25 is slidably supported on the slider shaft 78. When the MFP 10 is standing by for a reading operation, the image reader 25 is located in a lower left-side end position with respect to the movable-reader glass 80. The image reader 25 can be driven to move in the widthwise direction along the slider shaft 78, i.e., in parallel with the swing axis R1, when a pulley belt system (not shown) is activated by controlling signals from the controller.

When the user places a sheet of original document, with a side to be scanned facing downward, or bound sheets with pages to be scanned facing downward, on the flatbed plane 22A, that is, when an auto-feeding function of the ADF 11 is not used, the image reader 25 is moved in the widthwise direction from the left-side end to the right-side end underneath the movable-reader glass 80 to scan the original document placed on the flatbed plane 22 to read images appearing on the sheet. The scanned images are converted into data signals and transmitted to the controller. The controller creates image data and controls behaviors of the MFP 10 including the image forming unit 29 according to the user's instructions. Meanwhile, when the auto-feeding function of the ADF 11 is activated, the image reader 25 is maintained still in a stop position 18 underneath the fixed-reader glass 79 and scans images appearing on the sheet being conveyed in the sheet path.

Sheet Conveyer

The ADF 11 includes the sheet-feed tray 12, the sheet path 16, the discharge tray 14, a bottom cover 30, an upper chute 34, a lower chute 36, and an upper cover 32 (see FIG. 2). The sheet path 16 includes a first sheet path 26, a curved sheet path 27, and a second sheet path 28. The sheet 9 is conveyed in the sheet path 16 in a direction of sheet-conveying flow, which starts from the sheet-feed tray 12 and ends at the discharge tray 14.

Figure 6:
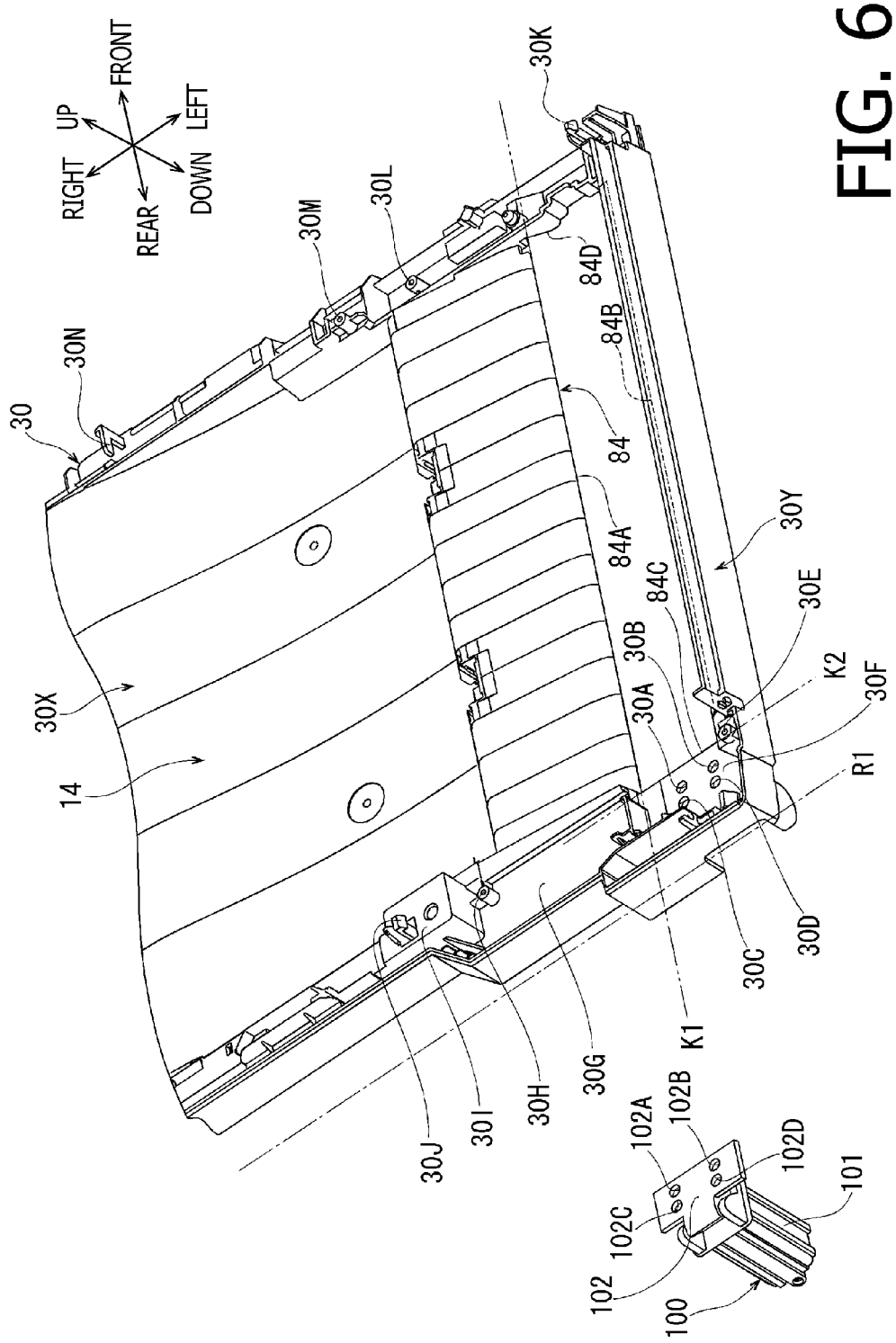
FIG. 6 is a perspective view of a bottom cover and a main hinge in the MFP according to the embodiment of the present invention.
Figure 7:
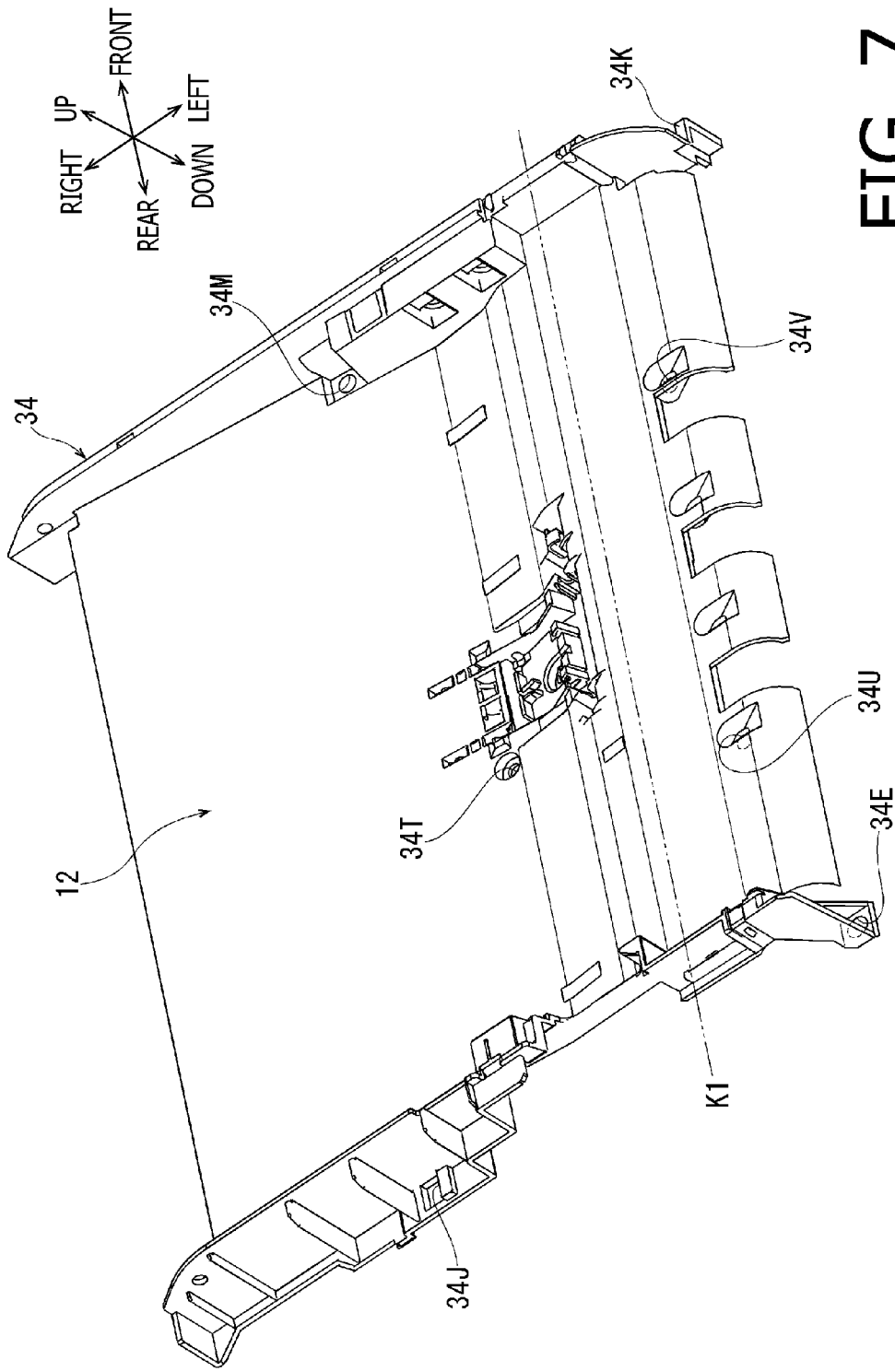
FIG. 7 is a perspective view of an upper chute in the MFP according to the embodiment of the present invention.
Figure 8:
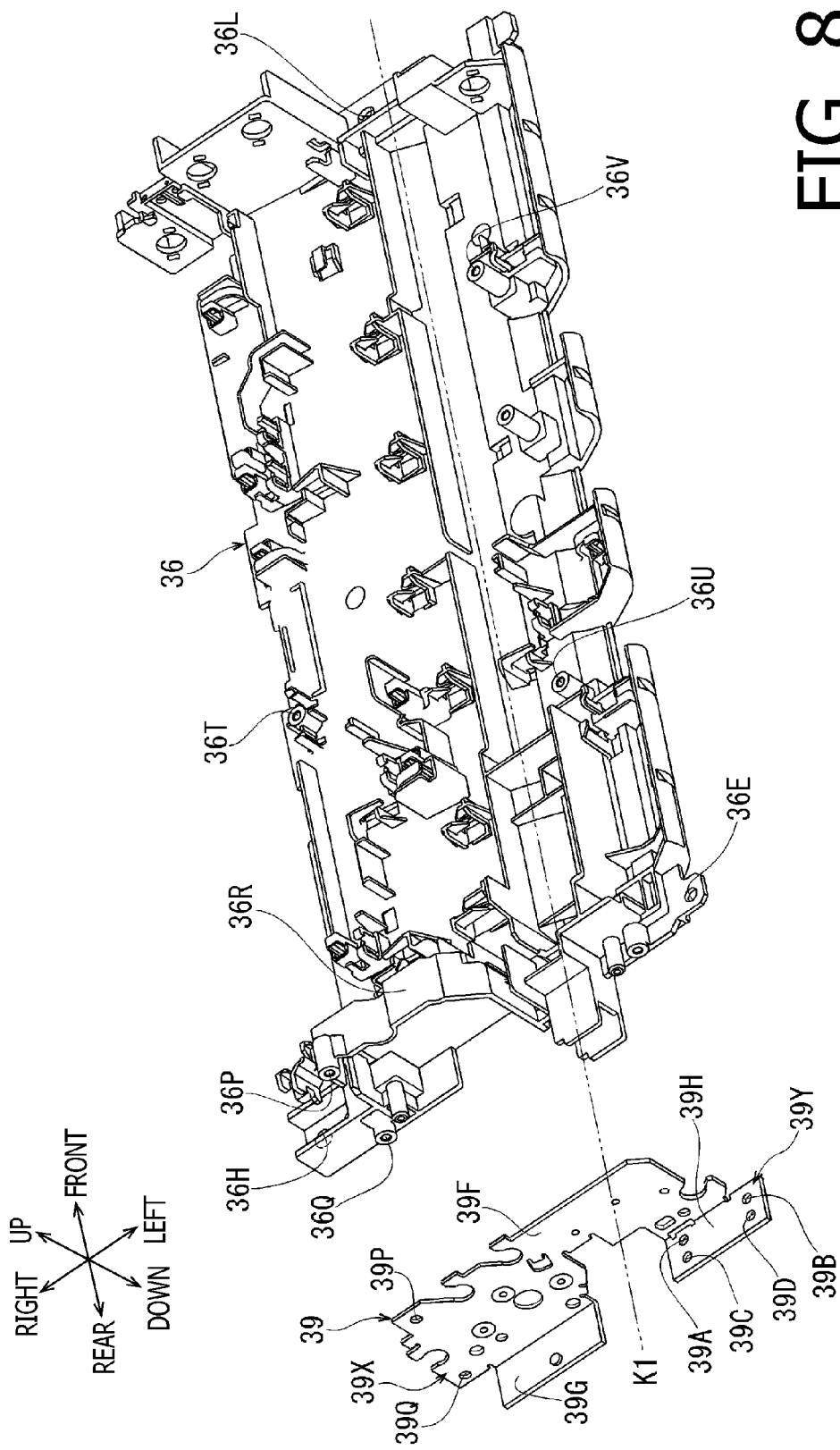
FIG. 8 is a perspective view of a lower chute and a metal frame in the MFP according to the embodiment of the present invention.

The bottom cover 30 is a resin-made tray-like covering, which covers a lower section of the ADF 11 and defines a bottom plane and a lateral side of the ADF 11 (see FIGS. 2, 3, and 6). The bottom cover 30 faces the flatbed plane 22A when the ADF 11 is in the closed position. A right-side part in a top surface of the bottom cover 30 serves as the discharge tray 14. The upper chute 34 is a flat plate made of resin, which extends in an upper-rightward inclined orientation (see FIGS. 2, 3, and 7). A right-side part in a top surface of the upper chute 34 serves as the sheet-feed tray 12, and a left-side part of the upper chute 34 serves as a part of the first sheet path 26. The lower chute 36 is a flat plate made of resin, which extends in a range between a lower position with respect to a main roller 64 and a position in vicinity of a discharge roller 72, and serves as a part of the second sheet path 28 (see FIGS. 2 and 8). The upper cover 32 is a resin-made covering arranged over a left-side part of the ADF 11 and covers the left-side part of the upper chute 34 (see FIGS. 1 and 2). The upper chute 34 and the lower chute 36 guide the sheet in the sheet paths 26, 28.

The sheet conveyer 42 is arranged in the eccentric position on the left-side part on the bottom cover 30 of the ADF 11. The sheet conveyer 42 picks up a sheet 9 separately from a plurality of sheets 9 set in the sheet-feed tray 12 and conveys the picked-up sheet 9 in the sheet path 16 to the discharge tray 14.

The first sheet path 26 in the sheet path 16 extends from the left-side end of the sheet-feed tray 12 to a position in vicinity of the main roller 67. The curved sheet path 27 extends continuously from the first sheet path 26 downwardly around a part of circumference of the main roller 67 in an arc. The second feed path 28 extends continuously from the curved sheet path 27 in an upper-rightward inclined orientation to the left-side end of the discharge tray 14.

The upper cover 32 in the ADF 11 is formed to have a plurality of enhancing ribs 191, 192 on an inner (lower) side thereof. The ribs 191, 192 protrude downwardly from an inner surface of the upper cover 32 and extend in a range between a right-side end of the upper cover 32 to a left-side end of the upper cover 32. The sheet 9 being conveyed from the sheet-feed tray 12 becomes in contact with lower edges of the ribs 191, 192 by an upper surface thereof and guided in the first sheet path 26 and a part of the curved sheet path 27. In other words, the ribs 191, 192 serve as a part of the first sheet path 26 and a part of the curved sheet path 27.

The main roller 64 is arranged in a lower position with respect to the left-side end of the ribs 191, 192 and in an inner-side position with respect to the left-side end of the bottom cover 30. The inner left-side surface of the bottom cover 30, the left-side ends of the ribs 191, 192 in the upper cover 32, and the outer circumference of the main roller 64 guide the sheet 9, which was conveyed through the first sheet path 26, toward the second sheet path 28. In other words, the inner left-side surface of the bottom cover 30, the left-side ends of the ribs 191, 192 in the upper cover 32, and the outer circumference of the main roller 64 serve as the curved sheet path 27.

The inner left-side surface of the bottom cover and the lower chute 36 in the ADF 11 guide the sheet 9 having been conveyed through the curved sheet path 27 and to be conveyed to the discharge tray. In other words, the inner surface of the bottom cover 30 and the lower chute 36 serve as the second sheet path 28.

The bottom cover 30 in the ADF 11 is formed to have a linearly elongated rectangular-shaped opening 84 in the second sheet path 28 in vicinity of a boundary between the second sheet path 28 and the curved sheet path 27 (see FIGS. 2 and 6). When the ADF 11 is in the closed position, the linear opening 84 comes to a position above the fixed-reader glass 79 and the image reader 25 being in the stop position 18. The linear opening 84 extends along the direction of depth of the MFP 10 and along a direction orthogonal to the swing axis R1. The sheet 9 being conveyed in the second sheet path 28 passes through the linear opening 84 over the fixed-reader glass 79 in the main unit 20. In this regard, the sheet 9 passing through the linear opening 84 is exposed to the image reader 25 being at the stop position 18 to scan the image formed on the sheet 9. When the sheet 9 passing through the linear opening 84 returns in the second sheet path 28, a separator 81 arranged in a position between the fixed-reader glass 79 and the movable-reader glass 80 directs the sheet 9 to be separated from the fixed-reader glass 79 and to return in the second sheet path 28.

The sheet conveyer 42 is arranged in an upper position with respect to the upper chute 34 and includes a first rotation shaft 56, a separator roller 54, a separator pad 57, and a pickup roller 52. The first rotation shaft 56 extends along the direction of depth of the MFP 10. The separator roller 54 is a rod fixed to a center area in an axial length of the rotation shaft 56 coaxially with the rotation shaft 56. The separator pad 57 is arranged in a lower position with respect to the separator roller 54. The pickup roller 52 is arranged in a front position with respect to the separator roller 54 and rotates in synchronization with the separator roller 54.

The first rotation shaft 56 is rotatably supported by a metal frame 39 (see FIG. 3) at a rear end thereof, although an image of the first rotation shaft 56 is omitted from FIG. 3. The metal frame 39 is a press-formed plate (see FIGS. 8 and 9), which has a predetermined rigidity and is arranged an outer position in adjacent to a rear edge 36R of the lower chute 36 to be attached to a part of the lower chute 36 and to a part of the bottom cover 30. An attaching method to attach the metal frame 39 to the lower chute 36 and the bottom cover 30 will be described later in detail.

The first rotation shaft 56 is driven by driving force transmitted from a drive source, which includes a motor (not shown) and a plurality of gears (not shown), to rotate in a predetermined direction (e.g., counterclockwise in FIG. 2). The drive source may be arranged on a rear side of the metal frame 39.

The pickup roller 52 is arranged in a position to become in contact with the sheets 9 set in the sheet-feed tray 12. As the pickup roller 52 rotates, the sheets 9 including a topmost sheet is picked up to be drawn in the first sheet path 26. The separator roller 54 becomes in contact with the topmost sheet 9 being picked up by the pickup roller 52, and as the separator roller 54 rotates, the sheet 9 is further conveyed in the first sheet path 26. In this regard, the topmost sheet 9 is separated from the other sheets 9 by friction force caused between the separator roller 54 and the separator pad 57. Thus, the sheets 9 set in the sheet-feed tray 12 are picked up one-by-one from the top and conveyed in the first sheet path 26 to a downstream side (i.e., toward the discharge tray 14) of the sheet-conveying flow.

The sheet conveyer 42 further includes a second rotation shaft 66, a conveyer roller 61, a pinch roller 65, a third rotation shaft 67, the main roller 64, and pinch rollers 62, 63. The second rotation shaft 66 is arranged in a left-side position with respect to the separator roller 54 (see FIG. 2) in the first sheet path 26, that is, in a downstream position with respect to the separator roller 54 along the sheet-conveying flow. The conveyer roller 61 is a rod coaxially fixed to the second rotation shaft 66. The pinch roller 65 is arranged in a position opposite from the conveyer roller 61 across the first sheet path 26. The third rotation shaft 67 is arranged in the curved sheet path 27, and the main roller 64 is coaxially fixed to the third rotation shaft 67. The pinch rollers 62, 63 are arranged in positions opposite from the main roller 64 across the curved sheet path 27.

The second rotation shaft 66 is rotatably supported by the metal frame 39 (see FIG. 3) at a rear end thereof, although an image the second rotation shaft 66 is omitted from FIG. 3. The second rotation shaft 66 is driven by the drive source (not shown) to rotate in the predetermined direction (e.g., clockwise in FIG. 2) integrally with the conveyer roller 66. Accordingly, the sheet 9 being conveyed by the separator roller 54 is nipped by the conveyer roller 61 and the pinch roller 65 to be further conveyed in the curved sheet path 27.

The third rotation shaft 67 is rotatably supported by the metal frame 39 (see FIG. 3) at a rear end thereof, although an image the third rotation shaft 67 is omitted from FIG. 3. The third rotation shaft 67 is driven by the drive source (not shown) to rotate in a predetermined direction (e.g., counter-clockwise in FIG. 2) integrally with the main roller 67. Accordingly, the sheet 9 being conveyed by the conveyer roller 61 is nipped by the main roller 67 and the pinch rollers 62, 63 to be further conveyed in the second sheet path 28.

The sheet conveyer 42 further includes a fourth rotation shaft 71, a discharge roller 72, and a pinch roller 74. The fourth rotation shaft 71 is arranged in vicinity of a rightmost section of the lower chute 36, that is, at a most downstream position along the sheet-conveying flow in the second sheet path 28. The discharge roller 72 is coaxially fixed to the fourth rotation shaft 71, and the pinch roller 74 is arranged in a position opposite from the discharge roller 72 across the second sheet path 28.

The fourth rotation shaft 71 is rotatably supported by the metal frame 39 (see FIG. 3) at a rear end thereof, although an image the fourth rotation shaft 71 is omitted from FIG. 3. The fourth rotation shaft 71 is driven by the drive source (not shown) to rotate in a predetermined direction (e.g., counter-clockwise in FIG. 2) integrally with the discharge roller 72. Accordingly, the sheet 9 being conveyed in the second sheet path 28 is nipped by the discharge roller 72 and the pinch roller 74 to be released in the discharge tray 14.

Further, the ADF 11 includes a presser piece 82, in a position opposite from the image reader 25 being at the stop position 18 across the second sheet path 28. The presser piece 82 is attached to a lower plane of the lower chute 36 via an expanding coil spring (unsigned), which urges the presser piece 82 downwardly. The sheet 9 being conveyed in the second sheet path 28 is pressed toward the image reader 25 by the presser piece 82 while being scanned by the image reader 25.

Auto-Reading Behaviors of the ADF

Behaviors of the ADF 11 in an auto-reading operation to automatically read images from the sheet 9 being conveyed in the sheet path 16 will be described. A user sets at least one sheet 9 of original document in the sheet-feed tray 12 and inserts a left-side edge of the sheet 9 underneath the pickup roller 52. When the user enters an instruction to start the auto-reading operation through the operation panel 3, the controller manipulates the sheet conveyer 42 and the image reader 25. According to the instruction, the image reader 25 moves to the stop position below the fixed-reader glass 79. The sheet 9 in the sheet-feed tray 12 is picked up by the sheet conveyer 42 and conveyed in the first sheet path 26 and to the curved sheet path 27. When the sheet 9 is conveyed in the curved sheet path 27, the sheet 9 is reversed to have a lower side upward and an upper side downward. When the sheet 9 passes over the image reader 25 being at the stop position 18, the image formed on the current lower side is read by the image reader 25. The sheet 9 is further conveyed in the second sheet path 28 and released in the discharge tray 14. If the user sets a plurality of sheets of original document in the sheet-feed tray 12, the above-described behaviors of the ADF 11 is repeated automatically until a last sheet 9 in the sheet stack is discharged in the discharge tray 14.

Image Forming Unit

Figure 5:
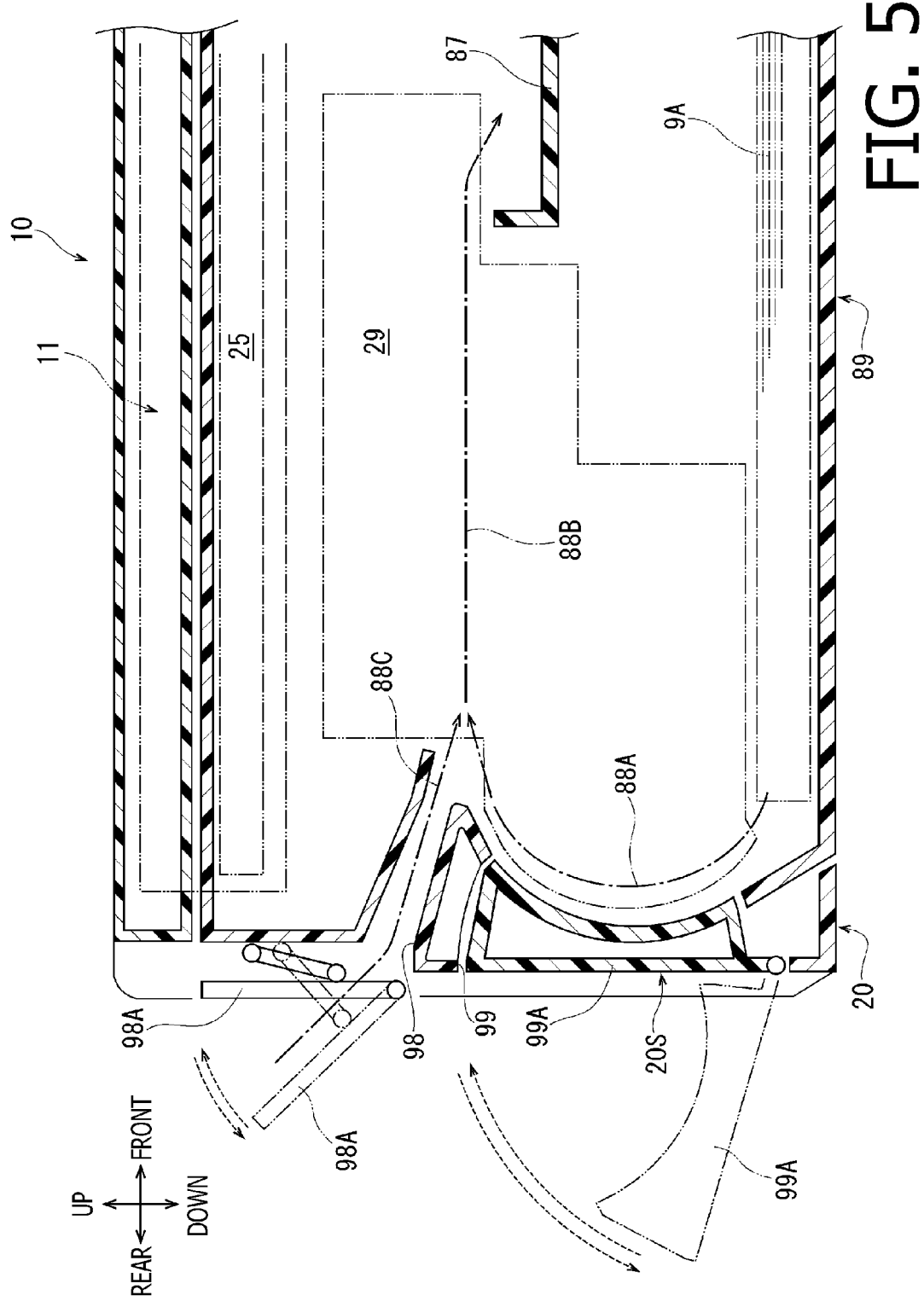
FIG. 5 is a cross-sectional partial view of a rear side of the ADF and the main unit in the MFP according to the embodiment of the present invention.

The MFP 10 in the present embodiment has the image forming unit 29 in a lower section in the main unit 20 with respect to the image reader 25 (see FIG. 5). The image forming unit 29 may form images in a known image-forming method, which may be, for example, electrophotographic printing, or inkjet-printing. Description concerning the image-forming method is herein omitted.

The MFP 10 has a sheet cassette 89, in which unused sheets 9A are stored, in a bottom section of the main unit 20. Further, the MFP 10 has a sheet catch tray 87, in which used sheets 9A with images printed thereon are released, in an upper front position with respect to the sheet cassette 89 in the main unit 20. The main unit 20 is designed to have a curved sheet path 88A, which extends from a rear end of the sheet cassette 78 and is curved upwardly and toward front to a horizontal sheet path 88B. The horizontal sheet path 88B is formed continuously from the curved sheet path 88A and extends to the sheet catch tray 87.

When an instruction for image forming is entered, the image forming unit 29 picks up the sheet 9A from the sheet stack in the sheet cassette 89 and conveys the picked up sheet 9A in the curved sheet path 88A. The sheet 9A being carried in the curved sheet path 88A is reversed upside down and directed frontward to the horizontal sheet path 88B. Whilst the sheet 9A is carried in the horizontal sheet path 88B, the image forming unit 29 forms an instructed image on a current upper side of the sheet 9A. The sheet 9A is further carried in the horizontal sheet path 88B and released in the sheet catch tray 87.

The MFP 10 is provided with an opening 99 for condition maintenance and a flap cover 99A to cover the opening 99 in a lower-rear section of the main unit 20. The flap cover 99A is rotatably supported by the rear side of the main unit 20 to be rotatable about a lower edge thereof. When the flap cover 99A is opened, the opening 99 is exposed, and the user may access internal components of the main unit 20 (e.g., the image forming unit 29). The user may access the image forming unit 29 to remove the sheet 9A jammed in the paths 88A, 88B or to exchange consumable materials in the image forming unit 29. Thus, the internal components can be maintained in an operable condition.

The MFP 10 is further provided with an external-sheet inlet 98 and an external sheet tray 98A covering the external-sheet inlet 98 in an upper position with respect to the opening 99 in an upper-rear section of the main unit 20. The external sheet tray 98A is rotatably supported by the rear side of the main unit 20 to be rotatable about a lower edge thereof. Meanwhile, inside the main unit 20, an external-sheet path 88C is arranged. The external-sheet path 88C is a sheet path for externally-inserted sheet, which extends in a frontward-lowered inclination from the external-sheet inlet 98 and merges into the horizontal sheet path 88B. The external sheet tray 98A can be rotated rearward and held in an inclined posture to expose the external-sheet inlet 98. When the user sets unused sheets on the inclined external sheet tray 98A and inserts front ends of the unused sheets in the main unit 20 along the external-sheet path 88C, the externally-inserted sheets are carried in the horizontal sheet path 88B. The image forming unit 29 conveys the externally-inserted sheet forward along the horizontal sheet path 88B and forms an instructed image on an upper side of the sheet. The sheet with the image formed on the upper side thereof is further carried in the horizontal sheet path 88B and released in the sheet catch tray 87.

The MFP 10 is formed to have a recessed section 20S (see FIGS. 1 and 5), which extends vertically over the ADF 11 and the main unit 20, in a rear side thereof. Whilst the main hinge 100 and the auxiliary hinge 120 are respectively arranged in the leftmost section and the rightmost section along the swing axis R1 of the main unit 20 and the ADF 11, the recessed section 20S can be formed in a horizontal range W (see FIG. 1) between the main hinge 100 and the auxiliary hinge 120. Within the recessed section 20S, the opening 99 for condition-maintenance, the flap cover 99A, the external-sheet inlet 98, and the external sheet tray 98A can be space-efficiently arranged. Therefore, an entire volume of the MFP 10 can be reduced or prevented from being increased.

Fixing Structure of the Rotatable Fixing Section of the Main Hinge to the ADF

A fixing structure to fix the rotatable fixing section 102 of the main hinge 100 to the ADF 11 will be described in detail. According to the present embodiment, reaction force generated in between the ADF 11 and the rotatable fixing section 102 is absorbed in the bottom cover 30 via the metal frame 39, the upper chute 34, and the lower chute 36. In the description below, therefore, interrelation amongst the bottom cover 30 the metal frame 39, the upper chute 34, and the lower chute 36 will be also mentioned.

The rotatable fixing section 102 being a flat plate is formed to have four (4) openings 102A, 012B, 102C, 102D, which are in two-by-two alignment along the direction of depth and in the widthwise direction (see FIG. 6). In each of the openings 102A-102D, a fastening screw 92 (see FIG. 4) is inserted in an upward orientation.

Figure 11:
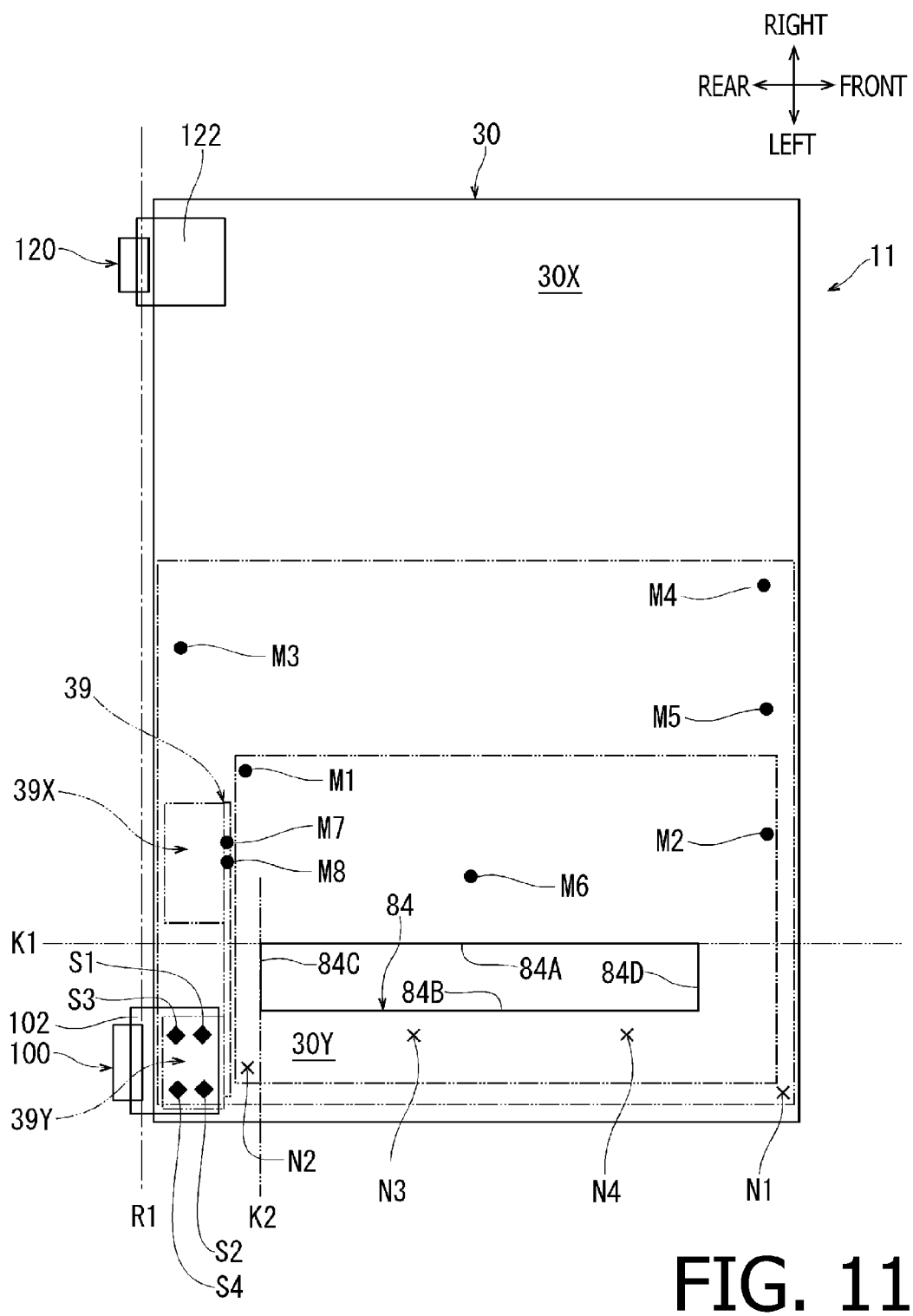
FIG. 11 is a plane view of the ADF to illustrate positional relation amongst the components and attaching assemblies in the MFP according to the embodiment of the present invention.

Meanwhile, in the bottom cover 30, the elongated rectangular-shaped linear opening 84 is formed. In the present embodiment, whilst longitudinal edges of the linear opening 84 extend orthogonally to the swing axis R1 of the ADF 11 (i.e., in parallel with the direction of depth of the MFP 10), one of the longitudinal edges closer to a widthwise center of the bottom cover 30 is referred to as a longer edge 84A, and the other of the longitudinal edges further from the widthwise center of the bottom cover 30 is referred to as a longer edge 84B. Further, one of crosswise edges extending in parallel with the swing axis R1 of the ADF 11 and closer to the swing axis R1 is referred to as a shorter edge 84C, and the other of the crosswise edges further from the swing axis R1 is referred to as a shorter edge 84D (see FIG. 11). Whilst the longer edges 84A, 84B are orthogonal to the shorter edges 84C, 84D, and vice versa, when the bottom cover 30 is affected by external force, reaction force to the external force in the bottom cover 30 tends to concentrate in four corner areas in the linear opening 84.

In the present embodiment, whilst a line including the longer edge 84A is referred to as a virtual line K1, and a line including the shorter edge 84C is referred to as a virtual line K2, an area, which ranges from the virtual line K1 to a rightmost edge of the bottom cover 30 along the swing axis R1, is defined as a main area 30X. Further, an area, which ranges from the virtual line K1 and a leftmost edge of the bottom cover 30 along the swing axis R1, is defined as an auxiliary area 30Y. In this regard, the metal frame 39 is arranged to perpendicularly straddle the virtual line K1 between the main area 30X and the auxiliary area 30Y (see FIGS. 9 and 11). A part in the metal frame 39, which is arranged in the main area 30X of the bottom cover 30 in a plane view, is defined as a main part 39X, and a part, which is arranged in the auxiliary area 30Y of the bottom cover 30 in a plane view, is defined as an auxiliary part 39Y (see FIG. 11). That is, the metal frame 39 extends in a range, which includes a part of the main area 30X and a part of the auxiliary area 30Y.

In the auxiliary area 30Y, which is on the left-hand side with respect to the virtual line K1, a fixed section 30F (see FIG. 6) is reserved on a side closer to the swing axis R1 with respect to the virtual line K2. The fixed section 30F is formed to have an upper plane and a lower plane, which are in parallel with each other. Four (4) openings 30A, 30B, 30C, 30D to vertically penetrate thickness of the fixed section 30F are formed in the fixed section 30F.

Further, in a rear side in the auxiliary area 30Y of the bottom cover 30, an upward-protruding engageable cylinder 30E is formed in a leftward position with respect to the fixed section 30F in vicinity of the leftmost edge of the bottom cover 30.

In a rear section in the main area 30X, a stepped plane 30G is formed in a rightward position with respect to the fixed section 30F across the virtual line K1. The stepped plane 30G is formed in a higher level with respect to the fixed section 30F. In a rightmost section in the stepped plane 30G, an upward-protruding engageable cylinder 30H is formed. Further, in a rightward position with respect to the stepped plane 30B, a stepped plane 30I is formed in a higher level with respect to the stepped plane 30G. In a center section in the stepped plane 30I, an upward-protruding engageable claw 30J is formed.

In a front section in the auxiliary area 30Y of the bottom cover 30, an upward-protruding engageable claw 30K is formed. In a rightward position with respect to the engageable claw 30K across the virtual line K1, in the main area 30X, an upward-protruding engageable cylinder 30L is formed. In a further rightward position with respect to the engageable cylinder 30L in the main area 30X, an upward-protruding engageable cylinder 30M is forms. In a further rightward position with respect to the engageable cylinder 30M, an upward-protruding engageable claw 30N is formed.

The upper chute 34 is formed to have a downward-protruding foot on a rear-left corner thereof, and an opening 34E (see FIG. 7) to vertically penetrate a horizontal plane of the foot is formed in a lower end section of the foot. Further, the upper chute 34 is formed to have an engageable rectangular opening 34J, which vertically penetrates the upper chute 34, in a rear section in a rightward position with respect to the opening 34E across the virtual line K1. The engageable rectangular opening 34J has a stepped edge (see FIG. 7) on a left side thereof.

Figure 10:
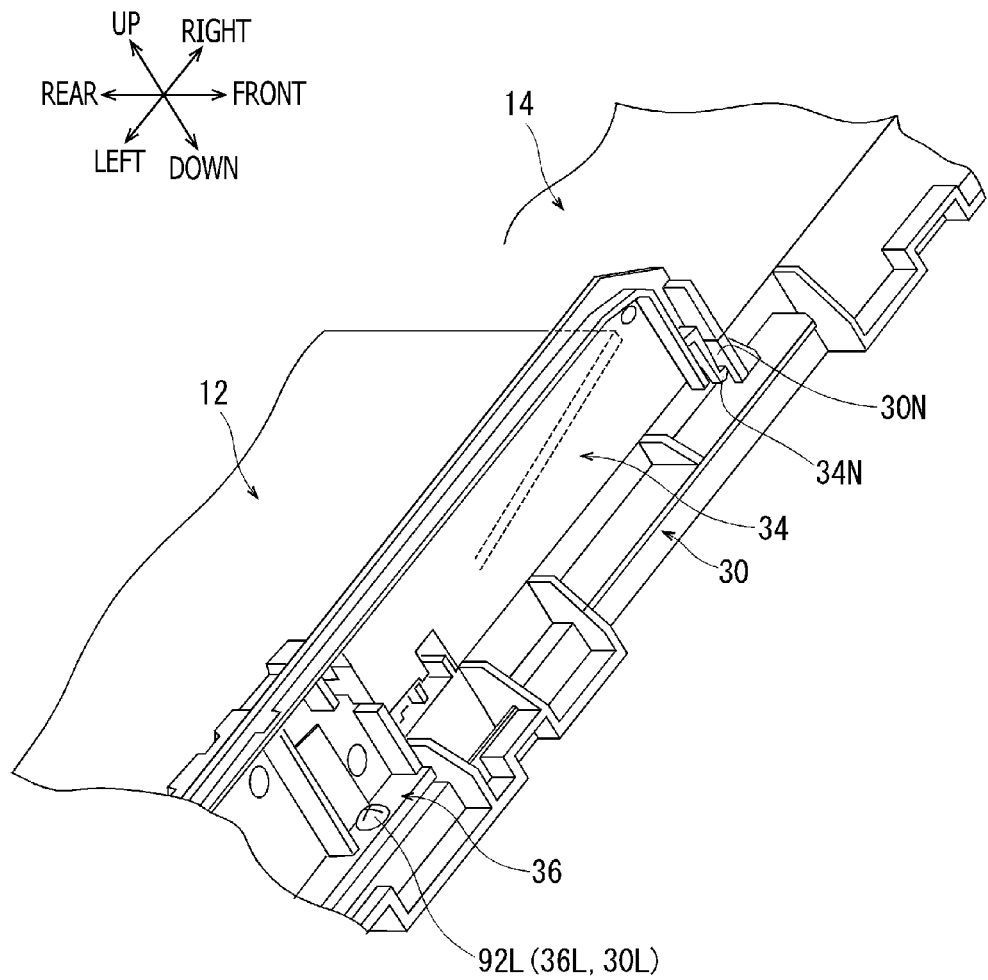
FIG. 10 is an enlarged partial view of the bottom cover, the lower chute, the upper chute in the MFP according to the embodiment of the present invention viewed along a direction X indicated in FIG. 3.

Further, the upper chute 34 is formed to have a frontward-protruding engageable rib 34K on a left-front corner thereof. Further, the upper chute 34 is formed to have an opening 34D, which vertically penetrates the upper chute 34, in the front section in a rightward position with respect to the engageable rib 34K across the virtual line K1. In a further rightward position with respect to the opening 34M, a downward-protruding engageable claw 34N (see FIG. 10) is formed.

Furthermore, the upper chute 34 is formed to have a vertically penetrating counter-bored opening 34T in a center area thereof. In sections closer to a leftmost edge of the upper chute 34, two (2) vertically penetrating counter-bored openings 34U, 34V are formed. The openings 34U, 34V align in line along the direction of depth of the MFP 10. The opening 34T is formed in a rightward position with respect to the virtual line K1, and the openings 34U, 34V are formed in leftward positions with respect to the virtual line K1.

The lower chute 36 is formed to have a leftward-protruding tab on a rear-left corner thereof, and a vertically penetrating opening 36E (see FIG. 8) is formed in the tab. Further, the lower chute 34 is formed to have two (2) engageable rods 36P, 36Q in rightward positions with respect to the opening 36E across the virtual line K1. The engageable rods 36P, 36Q extends rearwardly from a vertical plane of an upright section 36R. The engageable rods 36P, 36Q align in line along the vertical direction of the MFP 10. The lower chute 36 is formed to have a vertically penetrating opening 36H on a right-rear corner thereof.

Further, the lower chute 36 is formed to have a frontward-protruding tab in a front section thereof and in a rightward position with respect to the virtual line K1, and a vertically penetrating opening 36L is formed in the tab.

Furthermore, the lower chute 36 is formed to have an upward-protruding engageable cylinder 36T in vicinity of a rightmost edge of the lower chute 36 and in a center area along the direction of depth of the MFP 10. In sections closer to a leftmost edge of the lower chute 36, two (2) upward-protruding engageable cylinders 36U, 36V are formed. The engageable cylinders 36U, 36V align in line along the direction of depth of the MFP 10. The engageable cylinder 36T is formed in a rightward position with respect to the virtual line K1, and the engageable cylinders 36U, 36V are formed in leftward positions with respect to the virtual line K1.

The metal frame 39 includes an upright section 39F, which straddles the virtual line K1 and extends along the widthwise direction of the MFP 10. In a rightward section in the upright section 39F with respect to the virtual line K1, two (2) openings 39F, 39Q are formed. The openings 39F, 39Q horizontally penetrate the upright section 39F along the direction of depth of the MFP 10 and align in the vertical direction of the MFP 10.

The metal frame 39 includes a rectangular-shaped base section 39G, which extends orthogonally to the upright section 39F and rearwardly from a lower-right edge of the upright section 39F with respect to the virtual line K1. The metal frame 39 further includes a rectangular-shaped tightened section 39H, which extends orthogonally to the upright section 39F and rearwardly from a lower-left edge of the upright section 39F with respect to the virtual line K1. The tightened section 39H is formed to have four (4) vertically penetrating openings 39A, 39B, 39C, 39D.

A procedure to fix the upper chute 34 and the lower chute 36 to the bottom cover 30 will be described hereinbelow.

Firstly, the lower chute 36 is set over the bottom cover 30. In particular, a fastening screw 92H (see FIG. 9) is inserted and screwed in an inner tubular hole of the engageable cylinder 30H in the bottom cover 30 via the opening 36H in the lower chute 36. In this regard, the fastening screw 92H, the opening 36H, and the engageable cylinder 30H serve as a main attaching assembly M1 (see FIG. 11). Further, a fastening screw 92L is inserted and screwed in an inner tubular hole of the engageable cylinder 30L in the bottom cover 30 through the opening 36L in the lower chute 36. In this regard, the fastening screw 92L, the opening 36L, and the engageable cylinder 30L serve as a main attaching assembly M2 (see FIG. 11).

Secondly, the upper chute 34 is set over the lower chute 36, which is set over the bottom cover 30. In particular, the engageable claw 30J of the bottom cover 30 protrudes upward to be engaged with the edge of the engaged with the engageable rectangular opening 34J (see FIG. 9). In this regard, the engageable claw 30J and the engageable rectangular opening 34J serve as a main attaching assembly M3 (see FIG. 11). Meanwhile, the engageable claw 30N of the bottom cover 30 is engaged with the engageable claw 34N of the upper chute 34 (see FIG. 10). In this regard, the engageable claw 39N and the engageable claw 34N serve as a main attaching assembly M4 (see FIG. 11). Further, the engageable claw 30K of the bottom cover is engaged with the engageable rib 34K of the upper chute 34 (see FIG. 3). In this regard, the engageable claw 30K and the engageable rib 34K serve as an additional attaching assembly N1 (see FIG. 11).

A fastening screw 92E (see FIG. 9) is inserted and screwed in an inner tubular hole of the engageable cylinder 30E in the bottom cover 30 through the opening 34E of the upper chute 34E and the opening 36E in the lower chute 36. In this regard, the fastening screw 92E, the openings 34E, 36E, and the engageable cylinder 30E serve as an additional attaching assembly N2 (see FIG. 11). Meanwhile, a fastening screw 92M (see FIG. 3) is inserted and screwed in an inner tubular hole of the engageable cylinder 30M in the bottom cover 30 through the opening 34M in the upper chute 34. In this regard, the fastening screw 92M, the opening 34M, and the engageable cylinder 30M serve as a main attaching assembly M5 (see FIG. 11). Further, a fastening screw 92T (see FIG. 3) is inserted and screwed in an inner tubular hole of the engageable cylinder 36T in the lower chute 36 through the opening 34T in the upper chute 34. In this regard, the fastening screw 92T, the opening 36T, and the opening 34T serve as a main attaching assembly M6 (see FIG. 11). Furthermore, fastening screws 92U, 92V (see FIG. 3) are inserted and screwed in inner tubular holes of the engageable cylinders 36U, 36V in the lower chute 36 through the openings 34U, 34V in the upper chute 34. In this regard, the fastening screws 92U, 92V, the openings 34U, 34V, and the engageable cylinders 36U, 36V serve as additional attaching assemblies N3, N4 (see FIG. 11).

Figure 9:
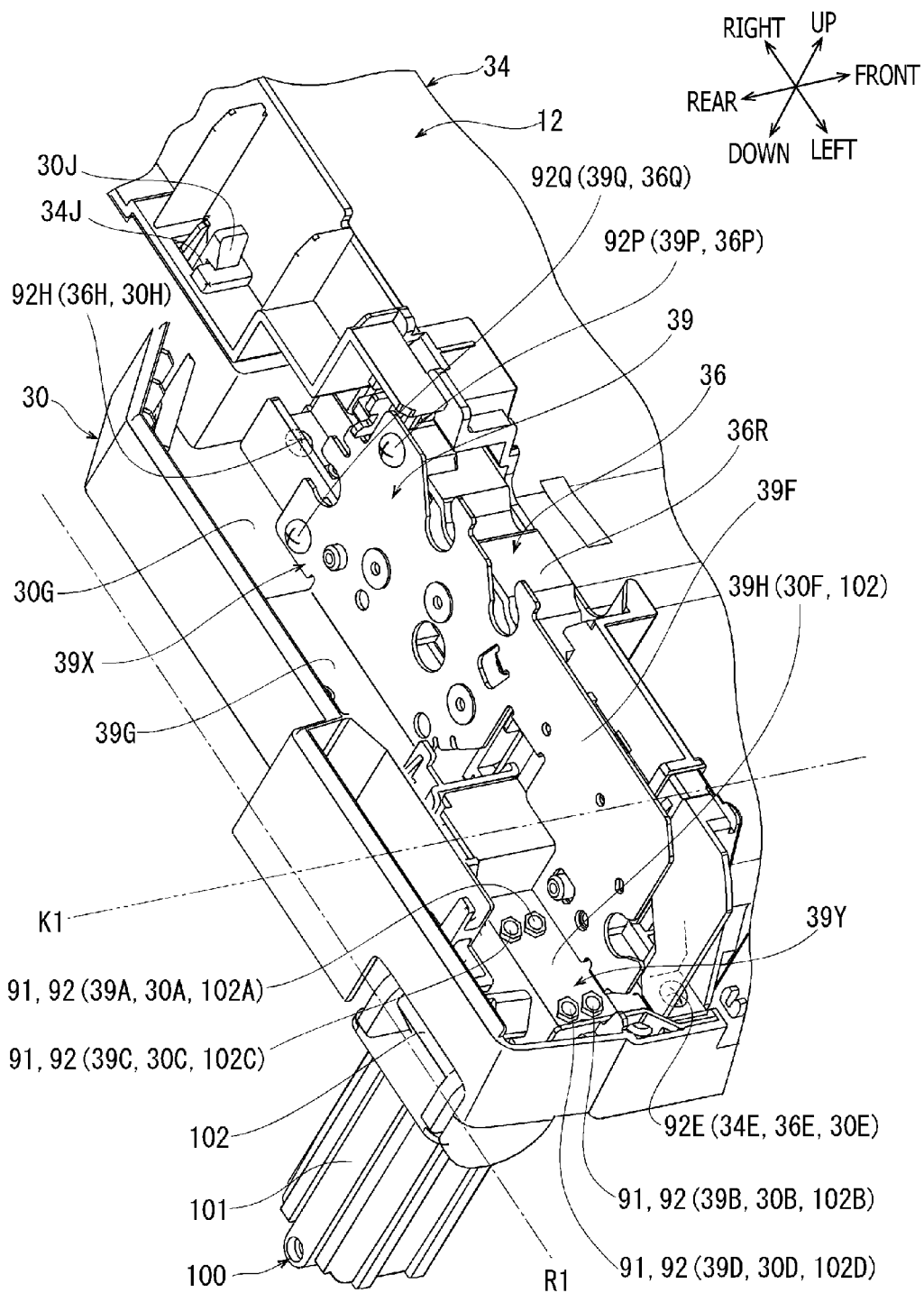
FIG. 9 is a perspective partial view of the bottom cover, the lower chute, the upper chute, and the metal frame in the MFP according to the embodiment of the present invention.

Thirdly, the rotatable fixing section 102 of the main hinge 100 and the metal frame 39 are fixed to the bottom cover 30 (see FIG. 9). In particular, the metal frame 39F is placed on the bottom cover 30 and along the lower chute 36 with the upright section 39F aligned with the rear edge 36R of the lower chute 36, the tightened section 39H placed on top of the fixed section 30, and with the base section 39G placed on top of the stepped plane 30G.

Thereafter, fastening screws 92P, 92Q are inserted and screwed in inner tubular holes of the engageable cylinders 36P, 36Q in the lower chute 36 through openings 39P, 39Q of the metal frame 39. In this regard, the fastening screws 92P, 92Q, the openings 39P, 39Q, and the engageable cylinders 36P, 36Q serve as main attaching assemblies M7, M8 (see FIG. 11) respectively.

Further, the main hinge 100 is placed in a position underneath the bottom cover 30 with the rotatable fixing section 102 aligned to a bottom plane of the fixed section 30F of the bottom cover 30. In this regard, the position of the main hinge 100 is adjusted to have the openings 102A-102D in the rotatable fixing section 102 to coincide with the openings 30A-30D in the fixed section 30F and with the openings 39A-39D in the metal frame 39. In the coinciding position, the fastening screws 92 are inserted upwardly and screwed in the openings 102A-102D, the openings 30A-30D, and the openings 39A-39D to penetrate the rotatable fixing section 102, the bottom cover 30, and the metal frame 39, and fastened by nuts 91 from top ends thereof. In this regard, the fastening screws 92, 92, 92, 92, the nuts 91, 91, 91, 91, the openings 102A, 102B, 102C, 102D, the openings 30A, 30B, 30C, 30D, and the openings 39A, 39B, 39C, 39D serve as auxiliary attaching assemblies S1, S2, S3, S4, respectively. Accordingly, the rotatable fixing section 102, the fixed section 30F, and the tightened section 39H are tightened to one another (see FIG. 4).

When the rotatable fixing section 102, the fixed section 30F, and the tightened section 39H are tightened together, the metal frame 39 is fixed to the bottom cover 30 by the main part 39X via the eight main attaching assemblies M1-M8 through the upper chute 34 and the lower chute 36. Further, the metal frame 39 is fixed to the rotatable fixing section 102 of the main hinge 100 via the four auxiliary attaching assemblies S1-S4 through the bottom cover 30 by the auxiliary part 39Y (see FIG. 11). In particular, the auxiliary attaching assemblies S1-S4 are in positions closer to the swing axis R1 of the ADF 11 with respect to the virtual line K2 including the shorter edge 84C. In other words, the auxiliary attaching assemblies S1-S4 are in displaced positions apart from two corners of the linear opening 84 closer to the swing axis R1. Therefore, the reaction force caused in between the auxiliary area 30Y of the bottom cover 30 and the rotatable fixing section 102 of the hinge 100 is reduced to be prevented from being transmitted to act on the closer corners.

Advantageous Effects

According to the above-described MFP 10, the main hinge 100 is a self-locking hinge having the torque generator 109, which provides expanding force to open the rotatable fixing section 102 with respect to the in-main-unit fixing section 101 and breaks movement of the rotatable fixing section 102 with respect to the in-main-unit fixing section 101. Therefore, the ADF 11 can be handled easily to expose and cover the flatbed plane 22A of the main unit 20, and handling convenience for the user of the MFP 10 is improved.

According to the above-described MFP 10, the main hinge 100 is attached to the ADF 11 by the rotatable fixing section 102, which is fixed to the leftmost position on the edge of the ADF 11 along the direction of the swing axis R1. Therefore, usable space for the recessed section 20S, in which the opening 99, the flap cover 99A, the external-sheet inlet 98, and the external sheet tray 98A can be space-efficiently arranged, can be reserved in the range between the main hinge 100 and the auxiliary hinge 120. In other words, the entire volume of the MFP 10 can be reduced or prevented from being increased.

Meanwhile, the main hinge 100 generates torque when the ADF 11 is opened to expose the flatbed plane 22A, and the torque is transmitted to act on the ADF 11. The torque transmitted to the ADF 11 causes reaction force in the section between the ADF 11 and the rotatable fixing section 102. Therefore, if the rotatable fixing section 102 is fixed to the auxiliary area 30Y of the bottom cover 30 directly without the intervening tightened section 39H of the metal frame 39, the reaction force tends to concentrate on the auxiliary area 30Y of the bottom cover 30, specifically on the areas around the two corners of the linear opening 84. With the concentrated force, when the ADF 11 is repeatedly opened and closed over a long period of time, the bottom cover 30 may be exhausted or damaged at the areas around the two corners.

However, according to the MFP 10 in the above-described configuration, the metal frame 39 with substantial rigidity is fixed to the bottom cover 30 via the main attaching assemblies M1-M8 by the main part 39X and to the rotatable fixing section 102 via the auxiliary attaching assemblies S1-S4 by the auxiliary part 39Y. Therefore, the MFP 10 can release the reaction force occurring in the area including the auxiliary attaching assemblies S1-S4 in the section between the ADF 11 and the rotatable fixing section 102 to the main area 30X of the bottom cover 30 via the metal frame 39. Accordingly, the reaction force is prevented from being concentrated in the auxiliary area 30Y of the bottom cover 30, and the bottom cover 30 is prevented from being damaged in the section in vicinity of the corners of the linear opening 84 and can be maintained steadily over a long period of time. In other words, the MFP 10 can be durable over a longer period of time whilst the handling convenience of the ADF 11 is improved and the entire volume of the image reading apparatus is reduced.

In particular, according to the above-described embodiment, the metal frame 39 and the main hinge 100 are tightened together at the auxiliary part 39Y (i.e., the tightened section 39H) and the rotatable fixing section 102 by the auxiliary attaching assemblies S1, S2, S3, S4 via the auxiliary part 39Y of the intervening bottom cover 30. Therefore, if the metal frame 39 is fixed to the rotatable fixing section 102 of the main hinge 100 by the auxiliary part 39Y, whilst the rotatable fixing section 102 is not fixed to the bottom cover 30 at the auxiliary area 30Y, nor the metal frame 39 is not fixed to the auxiliary area 30Y of the bottom over 30 by the auxiliary part 39Y, the main hinge 100 may not be firmly fixed to the bottom cover 30 (i.e., to the ADF 11). In other words, with the auxiliary part 39Y of the metal frame 39 and the rotatable fixing section 102 of the main hinge 100 are fixed to each other in the auxiliary area 30 of the bottom cover 30, the main hinge 100 can be steadily fixed to the ADF 11. Accordingly, the reaction force caused in the section between the bottom cover 30 at the auxiliary area 30Y and the rotatable fixing section 102 can be released in main area 30X of the bottom cover 30 via the metal frame 39. Whilst the reaction force is released in the bottom cover 30, the corners of the linear opening 84, which are closer to the swing axis R1 of the ADF 11 but apart from the auxiliary attaching assemblies S1-S4, are prevented from the concentration of the reaction force. Thus, the MFP 10 can be durable over a longer period of time whilst the handling convenience of the ADF 11 is improved and the entire volume of the image reading apparatus is reduced.

Meanwhile, attaching strength of the auxiliary part 39Y of the metal frame 39 with the auxiliary area 30Y of the bottom cover 30 are mutually related with the quantity of the main attaching assemblies M1-M8 and with the quantity of the auxiliary attaching assemblies S1-S4. According to the above-described embodiment, the quantity of the main attaching assemblies M1-M8 is eight (8), which is greater than the number (4) of the auxiliary attaching assemblies S1-S4. In this configuration, the reaction force caused in the section between the bottom cover 30 at the auxiliary area 30Y and the rotatable fixing section 102 of the hinge 100 is securely released in the main area 30X. Thus, the bottom cover 30 is prevented from being damaged in the section in vicinity of the corners of the linear opening 84, and the MFP 10 can be maintained steadily over a long period of time. In other words, the quantity of the main attaching assemblies should be at least equivalent to the quantity of the auxiliary attaching assemblies.

According to the MFP 10 described above, the upper chute 34 and the lower chute 36 to guide the sheet 9 being conveyed by the sheet conveyer 42 are formed to be larger than the sheet 9 and attached to the bottom cover 30. Whilst the main frame 39 at the main part 39X is fixed to the bottom cover at the main area 30X via the largely-formed upper chute 34 and the lower chute 36, the main attaching assemblies M1-M8 can be distributed widely within the main area 30X. Therefore, the reaction force caused in the section between the bottom cover 30 at the auxiliary area 30Y and the rotatable fixing section 102 of the hinge 100 is securely released in the widely reserved main area 30X. Thus, exhaustion of the bottom cover 30 in the vicinity of the linear opening 84 can be reduced, and the MFP 10 can be durable over a longer period of time.

According to the MFP 10 described above, the metal frame 39 also serves as a frame to support the rotation shafts 56, 66, 67, 71, and the drive force. Therefore, an additional frame to support the rotation shafts 56, 66, 67, 71, and the drive force can be omitted, and a quantity of the components in the MFP 10 can be reduced. Further, whilst the metal frame 39 can be formed to be thinner but more rigid than a resin frame, the metal frame 39 can be space-efficiently installed in a down-sized MFP 10.

Although an example of carrying out the invention has been described, those skilled in the art will appreciate that there are numerous variations and permutations of the image forming apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the fastening screw 92E, the opening 34E, the opening 36, and the engageable cylinder 30E may also serve to fix the rotatable fixing section 102 to the bottom cover 30.

For another example, the attachment amongst the upper chute 34, the lower chute 34, the bottom cover 30, the metal frame 39, and the main hinge 100 may not necessarily be achieved by the fastening screws, the openings, the engageable claws, the engageable cylinders, the engageable ribs, or the tabs as described above, but may be replaced with, for example, inserting a projection into a tightly fitting pit, or inserting a rail in a tightly fitting groove.

For another example, the metal frame 39 may be directly fixed to the bottom cover 30 at the main part 39X. In this configuration, without the intervening upper chute 34 or the lower chute 36, the reaction force caused in vicinity of the area around the auxiliary attaching assemblies S1-S4 may be transmitted to and distributed in the bottom cover 30 directly from the metal frame 39. In this regard, the base section 39G of the metal frame 39 may be directly fixed to a base section of the bottom cover 30 by fastening screws.

What is claimed is:

1. An image reading apparatus, comprising:
   a main unit including a flatbed plane, on which a document sheet to be read is placed, and an image reader, which is movable in a range between a stop position at one side of the flatbed plane and the other side of the flatbed plane along a predetermined moving direction and is capable of reading an image on the document sheet placed on the flatbed plane; and
   a conveyer unit, which is coupled to the main unit via a main hinge to be swingable about a swing axis, the swing axis extending along a direction in parallel with the moving direction of the image reader, and movable between a closed position to cover the flatbed plane and an open position to expose the flatbed plane;
   wherein the main hinge comprises an in-main-unit fixing section, which is fixed to the main unit, and a rotatable fixing section, which is fixed to one of end positions along a direction of the swing axis of the conveyer unit, and generates torque to act on the conveyer unit when the conveyer unit is moved to the open position;
   wherein the conveyer unit comprises a lower cover, which faces the flatbed plane when the conveyer unit is in the closed position, a sheet conveyer, which is arranged on the lower cover and conveys the document sheet toward the image reader being at the stop position, and a rigid attachable member, which is attached to the lower cover;
   wherein the lower cover is formed to comprise an elongated-shaped opening, which extends along a direction orthogonal to the swing axis in a higher position with respect to the image reader being at the stop position when the conveyer unit is in the closed position, and over which the document sheet being conveyed by the sheet conveyer passes;
   wherein the opening includes paired orthogonal edges extending orthogonally to the swing axis of the conveyer unit,
   wherein, when a virtual line including one of the paired orthogonal edges closer to a widthwise center of the lower cover is provided, the lower cover includes a main area, which ranges from the virtual line to the other of the end positions along the direction of the swing axis of the conveyer unit, and an auxiliary area, which ranges from the virtual line to the one of the end positions along the direction of the swing axis of the conveyer unit; and
   wherein the attachable member extends in a range including a part of the main area and a part of the auxiliary area to straddle the virtual line between the main area and the auxiliary area and comprises a main part, which is arranged in the part of the main area, and an auxiliary part, which is arranged in the part of the auxiliary area; and
   wherein the attachable member is fixed to the lower cover by the main part and to the rotatable fixing section by the auxiliary part.

2. The image reading apparatus according to claim 1, wherein the rotatable fixing section is fixed to the auxiliary area of the lower cover; and
   wherein the attachable member is fixed to the auxiliary area of the lower cover by the auxiliary part.

3. The image reading apparatus according to claim 2, wherein the main part of the attachable member and the main area of the lower cover is attached to each other by at least one main attaching assembly.

4. The image reading apparatus according to claim 3, wherein the auxiliary part of the attachable member and the auxiliary area of the lower cover is attached to each other by at least one auxiliary attaching assembly; and
   wherein a quantity of the main attaching assembly is one of equivalent to and greater than a quantity of the auxiliary attaching assembly.

5. The image reading apparatus according to claim 1, wherein the conveyer unit comprises a guide member, which is attached to the lower cover and guides the document sheet being conveyed by the sheet conveyer in a sheet path; and
   wherein the main part of the attachable member and the main area of the lower cover are fixed to each other via the guide member.

6. The image reading apparatus according to claim 1, wherein the attachable member is a metal frame to support at least one of a shaft, a rolling member, and a driving member, which serve as parts of the sheet conveyer.

7. The image reading apparatus according to claim 1, further comprising:
   an auxiliary hinge, which is arranged in a position separately from the main hinge and between the main unit and the conveyer unit to support the conveyer unit swingably with respect to the main unit;
   wherein the main unit is arranged in a lower position with respect to the image reader and includes an image forming unit to form an image on a sheet; and
   wherein the main unit is formed to comprise an opening for maintaining operational condition of the image forming unit.

8. The image reading apparatus according to claim 1, further comprising:

an auxiliary hinge, which is arranged in a position separately from the main hinge and between the main unit and the conveyer unit to support the conveyer unit swingably with respect to the main unit;

wherein the main unit is arranged in a lower position with respect to the image reader and includes an image forming unit to form an image on a sheet; and wherein the main unit is formed to comprise an inlet, through which a sheet to be supplied to the image forming unit is externally inserted, in a position between the main hinge and the auxiliary hinge.

* * * * *